Jan. 8, 1963 W. HAUPT ET AL 3,072,292
APPARATUS FOR CLEARING A METER FOR DISPENSED FLUID
Filed Feb. 23, 1960 8 Sheets-Sheet 1

FIG. 1

INVENTORS:
Wilhelm Haupt
Franz Neymeyer by:
Michael S. Striker
Attorney

Jan. 8, 1963   W. HAUPT ET AL   3,072,292
APPARATUS FOR CLEARING A METER FOR DISPENSED FLUID
Filed Feb. 23, 1960   8 Sheets-Sheet 6

INVENTORS:
Wilhelm Haupt
Franz Neymeyer by:
Michael S. Striker

United States Patent Office 3,072,292
Patented Jan. 8, 1963

3,072,292
APPARATUS FOR CLEARING A METER FOR DISPENSED FLUID
Wilhelm Haupt and Franz Neymeyer, Villingen, Black Forest, Germany, assignors to Kienzle Apparate G.m.b.H., Villingen, Black Forest, Germany
Filed Feb. 23, 1960, Ser. No. 10,339
Claims priority, application Germany Feb. 24, 1959
15 Claims. (Cl. 222—33)

The present invention relates to an apparatus for automatically clearing a meter for dispensed fluid, and more particularly to an apparatus which effects automatic clearing of the meter of a gas station when the dispensing nozzle at the end of a dispensing hose is removed from a support.

According to prior art constructions, the meter is cleared by a manual operation, or a spring motor is loaded before the start of a dispensing operation, and released at the end of the operation so that the spring motor clears the meter.

The manual operation required by the constructions of the prior art has inherent disadvantages, and it is one object of the present invention to overcome such disadvantages and to provide an apparatus for fully automatically clearing a meter.

Another object of the present invention is to provide a fully automatic apparatus which obtains clearing of a meter at a gas station when the dispensing nozzle is operated.

Another object of the present invention is to clear a meter by an apparatus which includes an accumulator loaded by the drive shaft of the meter and connected to the meter for clearing the same, when released.

A further object of the present invention is to provide means for loading the accumulator while the meter measures a selected minimum amount of fluid, and to disconnect the drive shaft of the meter from the accumulator when the selected minimum amount of fluid has been dispensed.

A further object of the present invention is to provide means which, in the event that less than the selected minimum amount is dispensed during a dispensing operation, effect full loading of the accumulator during the following dispensing operation.

A still further object of the present invention is to provide means permitting start of the dispensing pump only when the meter is cleared, and preventing the start of the dispensing pump during the clearing of the meter.

It is yet an object of the present invention to control the dispensing pump by the removal of the dispensing nozzle from its support.

With these objects in view, one embodiment of the present invention comprises an accumulator for effecting storage of energy when moved in a loading direction and tending to move in the opposite direction to release stored energy; first control means for operatively connecting the accumulator to a meter so that the accumulator is moved in the loading direction during operation of the meter; second control means for operatively connecting the accumlator to the meter so that the meter is cleared during movement of the accumulator in the opposite direction; and releasing means operatively connected to the accumulator for releasing the same so that the accumulator moves in said opposite direction and effects clearing of the meter.

In the preferred embodiment of the present invention, the accumulator is a spring motor which is loaded when the meter is driven by dispensed fluid, and blocking means are provided for blocking the spring motor against movement in the opposite direction until the blocking means are released by a manual operation, for example by removal of the dispensing nozzle from its support.

Preferably, actuating means such as the switch of an electric motor, are provided for starting and stopping a dispensing pump and locking means prevent the start of the pump while the meter is being cleared. On the other hand, the locking means also prevent the clearing of the meter while the dispensing pump operates. Preferably, the dispensing nozzle also controls the operation of the locking means.

The meter clearing apparatus of the present invention is advantageously used at gas stations, and at cerain gas stations there is the rule that no less than a selected minimum amount of gasoline must be dispensed. In accordance with the present invention, the apparatus is constructed in such a manner that the accumulator is fully loaded when the respective minimum amount of gasoline is dispensed. When the accumulator is fully loaded in this manner, the drive of the meter is automatically disconnected from the accumulator. In the event that during a dispensing operation less than the selected amount of gasoline is dispensed, the accumulator will not be fully loaded. In accordance with the present invention, the accumulator is fully loaded during the next following dispenser operation, whereupon the connection from the drive shaft of the meter to the accumulator is disconnected.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

Figure 1:
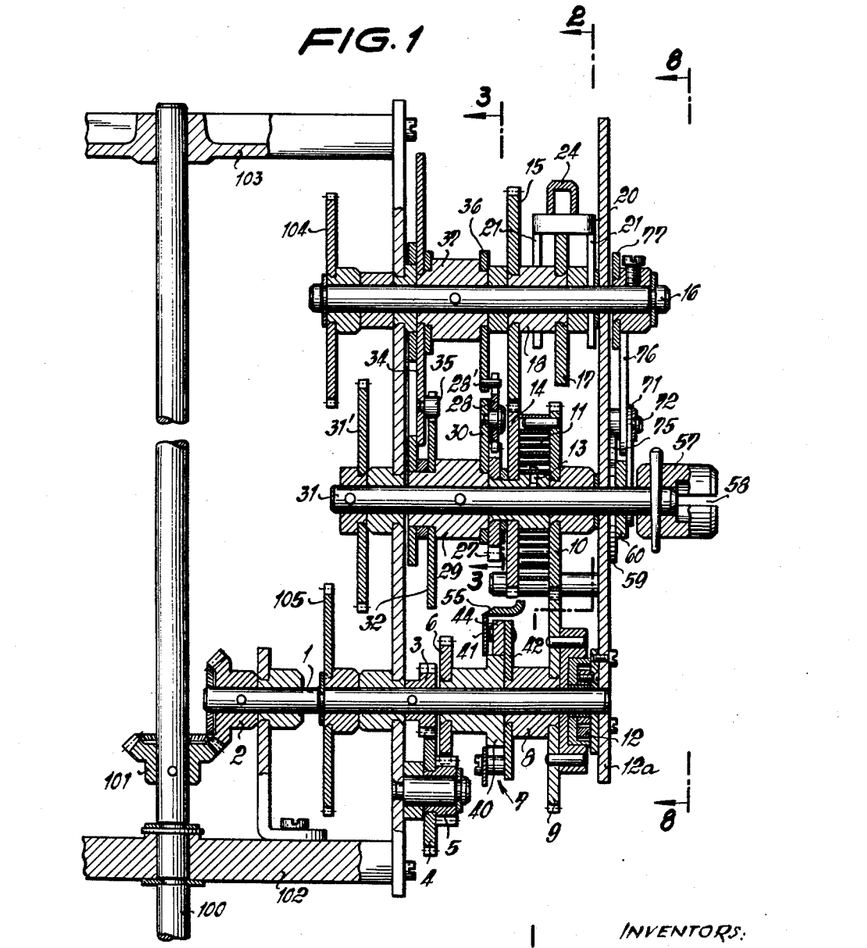
FIG. 1 is a fragmentary sectional view of a preferred embodiment of the present invention.
Figure 1A:
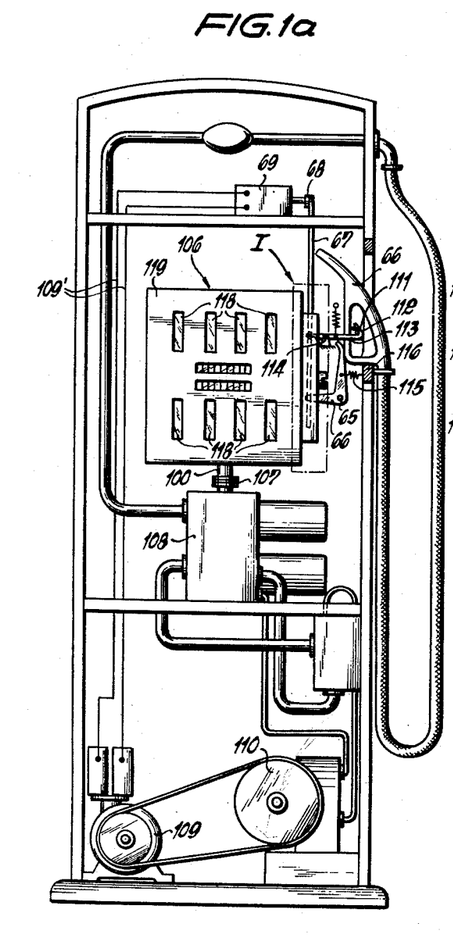
FIG. 1a is a front view of a gasoline pump station in which an apparatus according to the present invention as shown in FIG. 1 is located in a rectangle shown in broken lines and indicated by the arrow "FIG. 1"
Figure 1B:
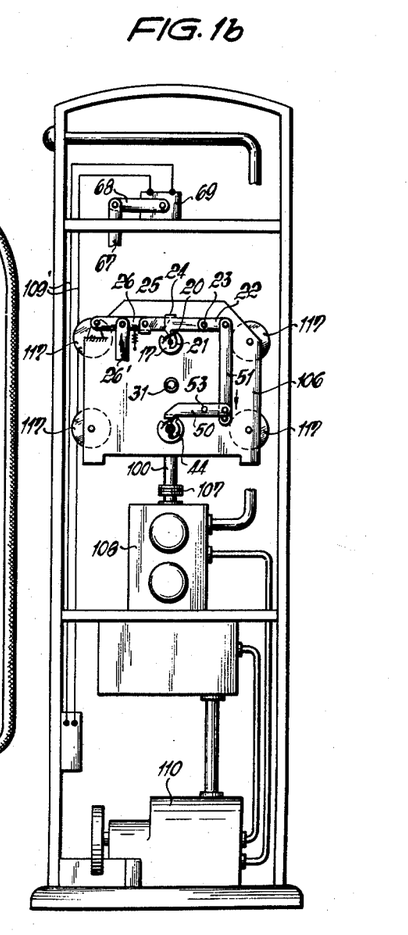
FIG. 1b and FIG. 1c are, respectively, side views of the station shown in FIG. 1a, partially shown in section along lines 2 and 8 in FIG. 1.
Figure 1C:
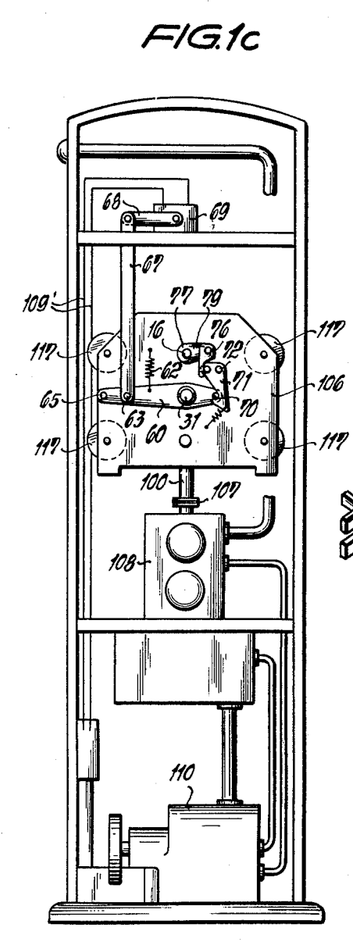

Referring now to the drawings, and first to the general views of FIGS. 1a, 1b and 1c, a pump 110 is driven by an electric motor 109 which is connected by lines 109' to an actuating switch means 69. The discharge conduits of pump 110 pass through an apparatus 108 by which the shaft 100 of the meter and price computer 106 is driven through a coupling 107. The meter arrangement 106 has number wheels 117 which can be observed through window 118 in a cover plate 119. After the fluid has passed through the drive means 108, it passes through conduits leading to the dispensing hose which terminates in a dispensing nozzle member 66.

Figure 2:
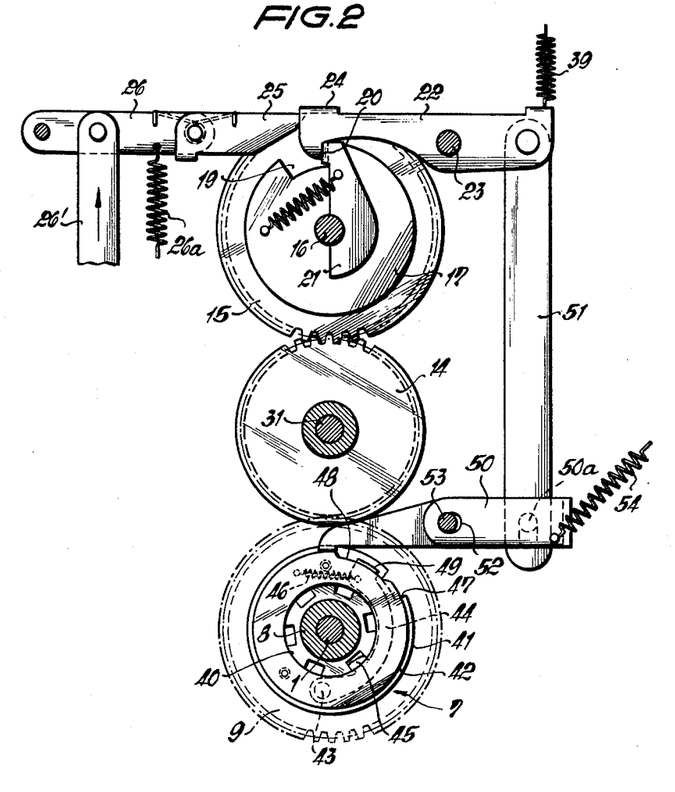
FIG. 2 is a fragmentary side elevation on an enlarged scale, partly in section along section line 2—2 in FIG 1.

The dispensing member 66 has two lateral pins 111 which are located behind an oblique surface 112 on a lever 113 which is turnably mounted at 114 and is operatively connected to member 26' shown in FIG. 2. An angular lever 64 is pivotally mounted on a pin 65 and is urged by spring 115 against a portion of the dispensing member 66 as will be described hereinafter in greater detail with reference to FIG. 8.

Figure 1D:
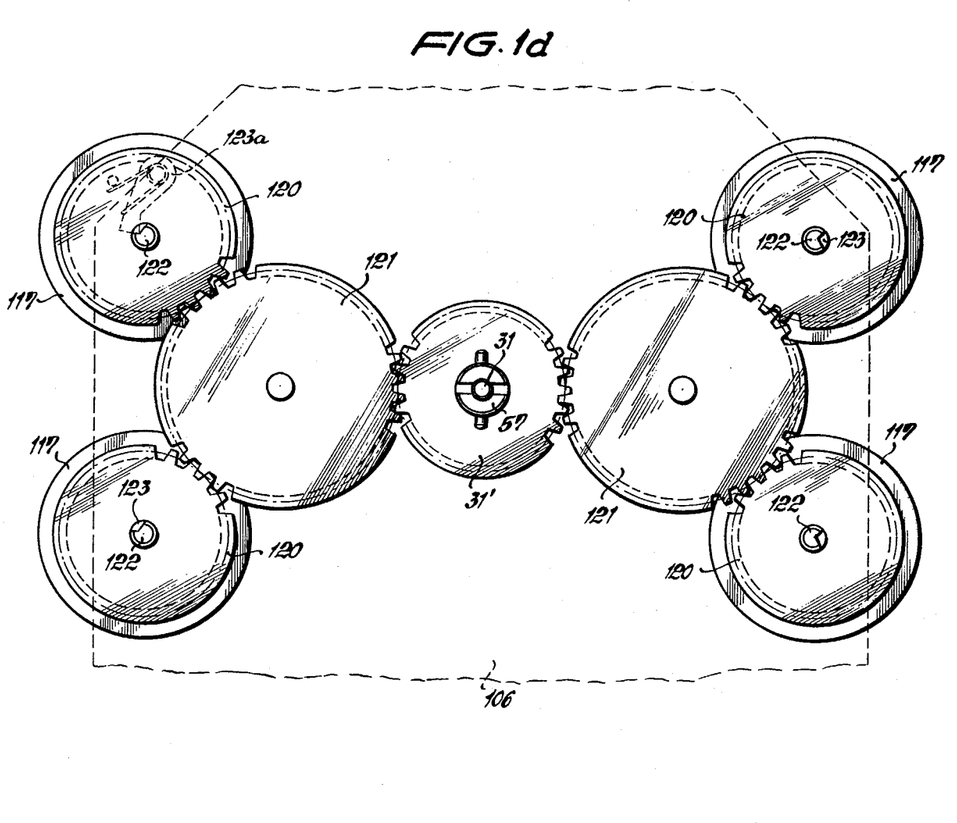
FIG. 1d is a fragmentary end view illustrating transmission means between the number wheels of meters used in the arrangement of FIG. 1a, and a control shaft operated by the apparatus of the present invention to clear the meters.
Figure 1E:
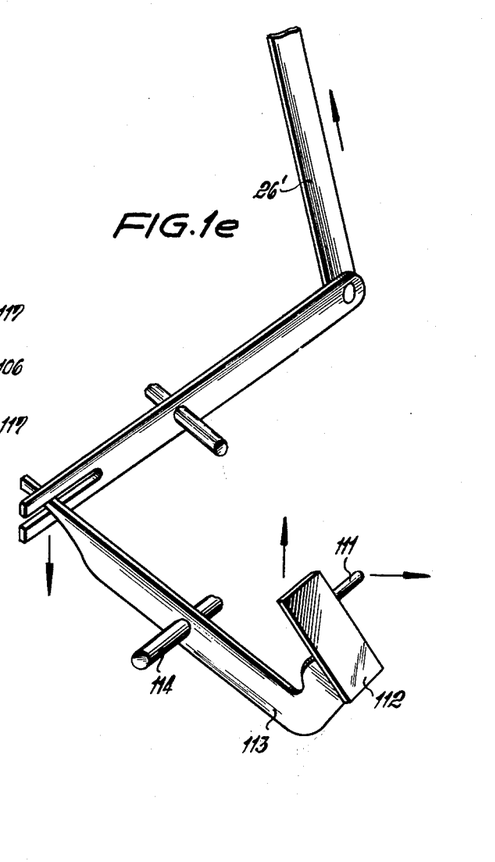
FIG. 1e is a perspective view of a detail of the apparatus shown in FIGS. 1a and 1b.

When the dispensing member 66 is removed from its support 116 at the start of a dispensing operation, pins 111 slide along the oblique surface 112 of lever 113 and turn the same about fulcrum pin 114 to effect actuation of member 26' through the intermediate lever 113a which is mounted on a shaft 113b and has at one end a slot in which the free end of lever 113 is guided, as shown in FIG. 1e. As shown in FIG. 1d, four meter shafts 122 are provided which have grooves 123 engaged by spring loaded pawls 123a, one of which is shown in FIG. 1d. Intermediate gears 121 mesh with gears 120, and are driven by a gear 31' on a shaft 31 which serves for clearing the meters and for resetting the price computer. The operation of shaft 31 will be explained hereinafter in greater detail, but it will be understood that turning of shaft 31 will effect turning of the meter shafts 122 which are connected by pawls 123a to the number wheels of the meters for clearing the meter and computer until it indicates zero. The construction by which the number wheels of the meters are returned to zero position, is not an object of the present invention.

Referring now to FIG. 1, the drive shaft 100 which is driven by liquid passing through drive means 108, and drives the meters and the computer, is mounted in supporting plates 102 and 103, and carries a fixed bevel gear 101 meshing with a bevel gear 2 secured to a shaft 1. Shaft 1 carries a gear 105, and another shaft 16 carries a gear 104 which are part of a transmission connected to the calculating computer means which determine the price of the dispensed amount of fluid.

Figure 3:
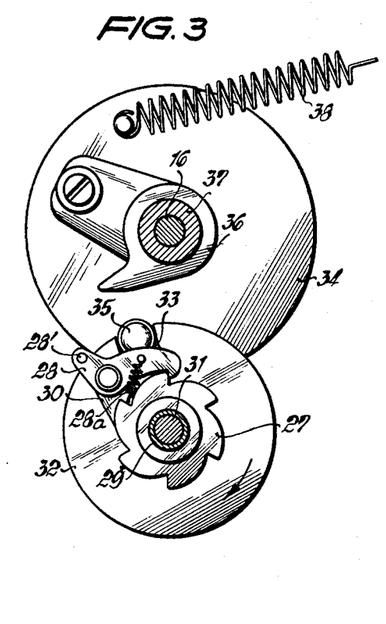
FIG. 3 is a side elevation on an enlarged scale, partly in section taken on line 3—3 in FIG. 1.

A gear transmission 3, 4, 5, 6 including the fixed gear 3, connects shaft 1 to a coupling means 7. Coupling means 7 is basically a one revolution coupling, and will be described hereinafter in greater detail. Disc 42 of coupling means 7 is fixed to a sleeve 8 which supports a gear 9 meshing with a gear 10 which is turnable on a shaft 31. Gear 10 is connected to the outer end of a spiral spring 11 whose inner end is connected to a bushing 13 to which a ratchet wheel 27 is secured as best seen in FIG. 3. When spring 11 is turned in one direction by gear 10 driven from shafts 1 and 100, it serves as an accumulator storing energy. A gear 14 is also fixed on bushing 13, and meshes with a gear 15 which is turnably mounted on a control shaft 16, and is connected by a bushing 18 to a blocking disc 17, best seen in FIG. 2. Blocking disc 17 has a peripheral cutout 19 engaged by a transverse portion 20 of a U-shaped spring-loaded blocking member 21.

A blocking lever 22 is turnably mounted on a stationary support pin 23 and has a hook-shaped portion 24 engaging portion 20 of blocking member 21, and holding the same in the position shown in FIG. 2. Blocking lever 22 is also U-shaped, and a link 51 is articulated to the end of blocking lever 22. A spring 39 urges blocking lever 22 and link 51 into the blocking position shown in FIG. 2.

Releasing means for blocking lever 22 include two articulated, spring-loaded levers 25 and 26 articulated to a link 26' which is connected to lever 113 which is controlled by the dispensing nozzle 66, as described with reference to FIG. 1a. When the dispensing nozzle 66 is raised from its support at the start of a dispensing operation, lever 113 is released, and the spring-loaded levers 25, 26 are raised so that the free end of lever 25 raises blocking lever 22 to a position releasing blocking member 21 and thereby releasing blocking disc 17 for turning movement, whereby gears 15 and 14 are also free to turn under the control of spring 11 when the spring accumulator unwinds and releases the energy stored therein.

Ratchet wheel 27, which is connected to the inner end of spring 11, cooperates with a spring-loaded latch 28 which is turnably mounted on a lever arm 30 which has a portion turnably mounted on bushing 29 which is fixedly connected to shaft 31. Latch 28 engages ratchet wheel 27 under the action of spring 28a, and has a stop pin 28'.

Shaft 31 is operatively connected to the meter and computer by which the dispensed fluid is measured and the price computed so that the meter and computer are cleared and returned to zero position when shaft 31 is turned.

The particular construction of the meter arrangement, which is not an object of the present invention, requires a turning of shaft 31 through an angle greater than 360° in clockwise direction as indicated by an arrow in FIG. 3, and then a rearward turning through the angle by which the first turning angle exceeded 360°. For example, in a preferred embodiment of the present invention, shaft 31 is turned through 410° in one direction, and then through 50° in the opposite direction so that in the final position, shaft 31 remains turned through 360°.

While the meter apparatus which is cleared by the turning movement of shaft 31 in the above described manner, is not an object of the present invention, the reason for the above described turning movement of shaft 31 is briefly the following: During the clearing operation of the meter, in which the number wheels are set to zero, the number wheels must be disconnected from the drive shaft of the meter. For this purpose, special coupling means are used, which establish a driving connection between the drive shaft and the number wheels when the meter operates, but do not effect driving of the stopped drive shaft of the meter, when the number wheels are driven from the clearing shaft 31. The turning direction of the number wheels is the same during the metering operation and during the clearing operation. The coupling means used in the arrangement have a certain unavoidable friction, even in disengaged connection, so that the turning movement of the number wheels during the clearing operation might be transferred to the transmission of the drive means so that the play between the respective gears would have an influence on the meter position. Consequently, it is desired that the stationary part of the coupling means is arrested during the clearing operation.

For this purpose, the stationary parts of the coupling means are locked while shaft 31 turns through the first 50°, and are released when shaft 31 is turned back through the same 50° after having been turned through 410°. Furthermore, an overrunning of the number wheels beyond the zero position must be avoided after a rapid clearing operation, and for this purpose, the price calculator includes stop means, which are turned to an effective position during the first part of the turning movement of shaft 31, and are returned to an inoperative position during the last part of the turning movement of shaft 31.

In the same manner, covers are temporarily brought into a position covering the observation windows of the meters, while the number wheels turn, and are retracted from the observation windows when the number wheels have stopped.

As exlained above, these functions are not an object of the present invention but require a turning of clearing shaft 31 a certain angle beyond a single revolution and then turning back of shaft 31 through the same angle so that in the final position, shaft 31 remains turned through 360°.

Figure 3A:
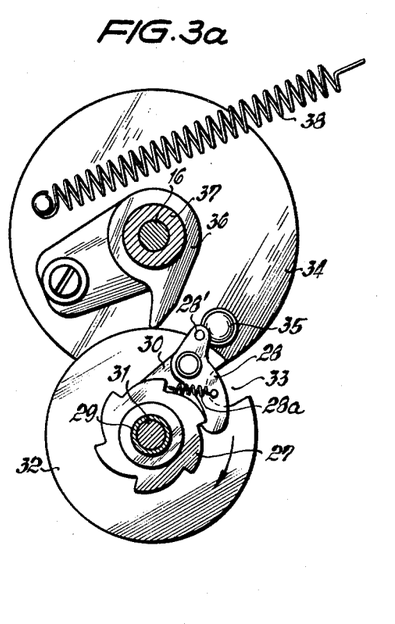
FIG. 3a is a side view corresponding to FIG. 3 but illustrating a different operational position of the elements.
Figure 4:
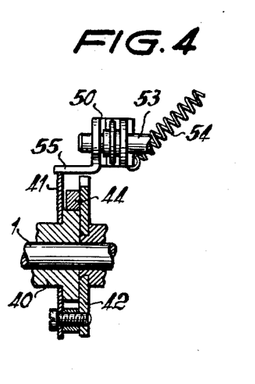
FIG. 4 is an axial sectional view of a coupling means applied in the preferred embodiment of the present invention.

In order to obtain the desired turning movement of shaft 31 first through an angle of 410° and then in opposite direction through an angle of 50° means are provided which are best seen in FIGS. 1, 3 and 3a. A circular disc 32 is fixed on bushing 29 and has a peripheral, radially extending slot 33. Another disc 34, and an abutment lever 36 are fixed to a bushing 37 secured to control shaft 16. Disc 34 carries a coupling pin 35 which is located in slot 33 of circular disc 32. Abutment lever 36 cooperates with the projecting pin 28' on latch 28. A spring 38 acts on disc 34 to turn the same in clockwise direction as viewed in FIG. 3 normally assume the position shown in FIG. 3.

The above described part of the apparatus operates as follows:

Assuming that a dispensing operation has been completed, the number wheels of the meter and of the calculator are stopped in a position indicating the previously dispensed amount of liquid, and the amount to be paid. During the disepnsing operation, gear 10 was driven from drive shaft 100 through transmission 101, 2, 1, 3, 4, 5, 6, 7, 8, and 9 so that the spring elements 11 of the accumulator is fully loaded. A one-way coupling 12 connects gear 9 with a stationary wall 12a, so that gear 10 cannot turn in a direction opposite to the loading direction.

Before a new dispensing operation is started, the meter must be cleared. This is automatically obtained when the attendant removes the dispensing nozzle 66 from lever 113. Lever 113 turns, and effects movement of link 26', see FIG. 2, in upward direction as indicated by an arrow, so that blocking lever 22 is raised whereby blocking member 21 and blocking disc 17 are released for turning movement.

The loaded spring 11 can now turn ratchet wheel 27 together with latch 28 from the position shown in FIG. 3 to the position shown in FIG. 3a. During such turning movement, the connection between slot 33 and pin 35 effects turning of disc 34 until pin 35 moves out of slot 33, so that further turning of disc 32 will not turn disc 34 since pin 35 will slide on the circular peripheral surface of disc 32 substantially from the position shown in FIG. 3a until slot 33 will have moved through substantially 360° to a position located underneath the coupling 35, so that pin 35 snaps again into slot 33 under the action of spring 38. Spring 38 will be further effective to turn disc 34 from the position shown in FIG. 3a in opposite direction to the previous turning movement to the position shown in FIG. 3, with disc 32 performing a corresponding turning movement in counterclockwise direction, until the initial position shown in FIG. 3 is again obtained.

Such movement in opposite direction would be prevented by the engagement between latch 28 and ratchet wheel 27, and consequently the connection between members 28 and 27 is temporarily interrupted, which is accomplished by the abutment lever 36.

Abutment lever 36 turns with disc 34 through substantially 50° from the position shown in FIG. 3 to the position shown in FIG. 3a, and then stops together with disc 34 while disc 32 continues its turning movement. When pin 28' engages abutment lever 36 shortly before coupling pin 35 snaps into slot 33, latch 28 is retracted from ratchet wheel 27, so that disc 32 can be turned by pin 35 and spring 38 in opposite direction to the initial position shown in FIG. 3 such turning of disc 34 will again separate abutment member 36 from pin 28' so that latch 28 will again engage ratchet wheel 27.

From the above description it will become apparent that spring 11 turns shaft 31 first through substantially 410°, whereupon spring 38 turns shaft 31 in opposite direction through substantially 50°. The turning movements of shaft 31 are possible, after blocking lever 22 released blocking member 21 and blocking disc 17 upon operation of the releasing means 25, 26 and the dispensing member 66.

Since lever 25 is raised only for a short time and immediately returns to its normal position under control of spring 26a, blocking lever 22 also returns to its blocking position under control of spring 39 in which it blocks members 21 and 17 and thereby shaft 31 through gears 15 and 14.

After the meter is cleared and set to zero position by removal of the dispensing nozzle 66 from its support, the dispensing operation is started during which the meter is driven from the drive means 108 through which the dispensed liquid flows. The drive shaft 100 drives the meter so that the number wheels turn and indicate the dispensed amount.

In accordance with the present invention, the turning movement of the drive shaft 100 is used for again storing in the spring element 11 of the accumulator. As explained above, this is accomplished by a transmission connecting drive shaft 100 with gear 10, and including a coupling means 7. Coupling means 7 normally operates as a one-revolution coupling, and disconnects the drive shaft 100 from the accumulator after a single revolution. In this manner, a breaking of spring 11 is prevented, which would otherwise occur if spring 11 would be continuously tensioned during a long dispensing operation. On the other hand, the spring 11 is so designed as to be fully loaded after a single revolution of shaft 1 so as to be capable of clearing the meter, as described above.

In certain states and countries, no less than a selected minimum amount of gasoline is dispensed by the attendant, and in this event, the arrangement must be so constructed that the dispensing of the minimum amount will result in full loading of spring 11.

However, if the attendant discharges less than the minimum amount required for fully loading spring 11 on several dispensing operations, spring 11 may not be capable of clearing the meter completely during unwinding of spring 11 in the manner explained above. Therefore, the coupling means 7 is constructed in accordance with the present invention in such a manner that, in the event that a short dispensing operation has not effected turning of the coupling means 7 through a full revolution, coupling means 7 turns a second revolution during the next following dispensing operation so that during such next following dispensing operation, the spring element 11 of the accumulator is fully loaded.

Figure 6:
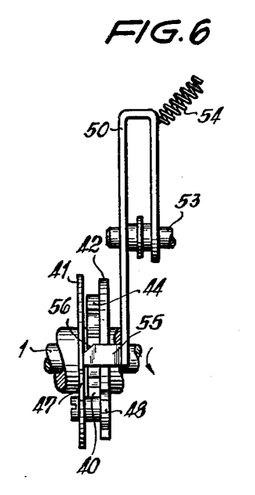
FIG. 6 is a plan view corresponding to FIG. 5a, but showing another operational position of the coupling means.
Figure 7:
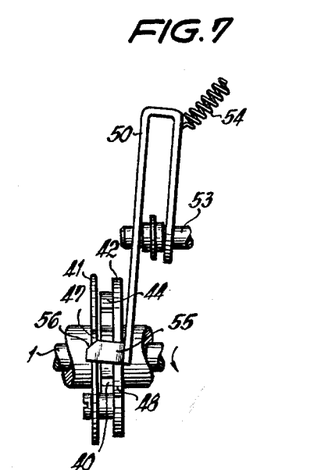
FIG. 7 is a plan view of the coupling means showing a further operational position.

The construction of coupling 7 will now be described with reference to FIGS. 2, 4, 5, 5a, 5b, 6, and 7. Gear 6 is fixed to the hub of a coupling wheel 40. Coupling discs 41 and 42 are arranged on opposite sides of coupling wheel 40, coupling disc 41 having a greater diameter. Coupling disc 41 has a peripheral coupling recess 47, and coupling disc 42 has a peripheral recess 48. Discs 41 and 42 are secured to each other by bolts. Coupling disc 42 is connected by bushing 8 with gear 9, as shown in FIG. 1 and supports on a pin 43 a latch 44 which is urged by a spring 46 into a position in which a first projection 45 thereon engages a recess on the periphery of coupling wheel 40. The free end of latch 44 has a second projection 49 located in the peripheral coupling recess 48 of coupling disc 42. Coupling means 7 is controlled by a control lever 50 which has a U-shaped part whose two legs have elongated slots 52, see FIG. 2, through which a stationary pin 53 passes. As best seen in FIGS. 6 and 7, one leg of lever 50 is extended and has a transverse projection 55 which is located in the region of the periphery of coupling disc 42 in the position of FIG. 6, but extends to the region of the periphery of coupling disc 41 when lever 50 is laterally displaced on pin 53 under the action of spring 54, which is possible due to the provision of the slots 52.

Figure 5:
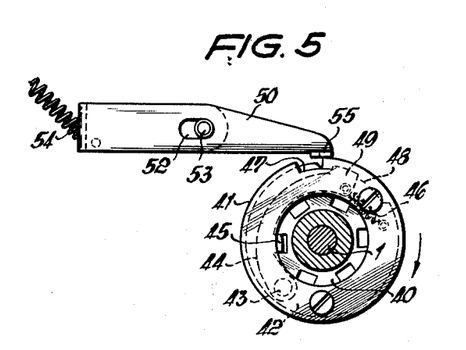
FIG. 5 is an end view, partly in section, of the coupling means shown in FIG. 4.
Figure 5A:
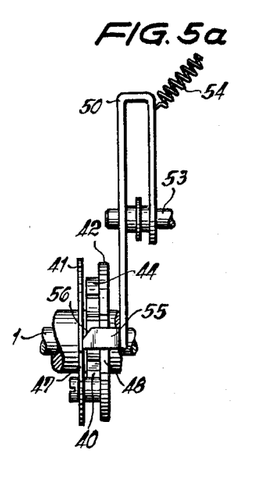
FIG. 5a is a fragmentary plan view illustrating the coupling means of FIGS. 4 and 5.
Figure 5B:
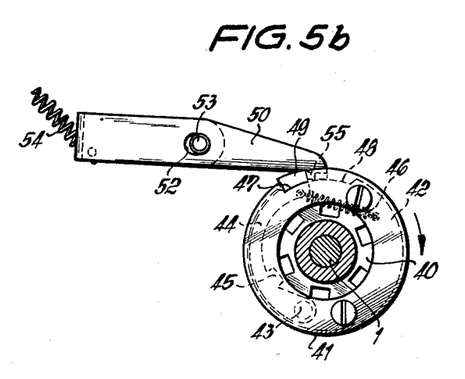
FIG. 5b is an end view, partly in section, corresponding to FIG. 5 but illustrating another operational position.

As shown in FIG. 2, lever 50 is connected by a pin and slot connection 50a to the link 51 which is articulated to the blocking lever 22. A spring 54 urges lever 50 to turn about pin 53 into a position in which the projection 55 engages the periphery of at least one of the coupling discs 41, 42. The coupling means operates as follows:

Assuming that a dispensing operation has been completed, and that spring element 11 of the accumulator is fully loaded, the projection 55 of lever 50 abuts the periphery of coupling disc 42, and more particularly is located in the peripheral recess 48 which has resulted in turning of the latch 44 to the position shown in FIG. 5b in which projection 45 is retracted from the recesses in the coupling wheel 40. Consequently, the coupling means is disengaged.

Before a new dispensing operation, the meter must be cleared, which requires release of the blocking lever 22, as described with reference to FIG. 2. When blocking lever 22 is turned, lever 50 is operated through link 51. Projection 55 is raised, and spring 54 becomes effective to laterally shift lever 50 so that the same assumes the position shown in FIGS. 5 and 7 in which projection 55 slides on the peripheral surface of coupling disc 41. During the turning of shaft 31 for clearing the meter, coupling means 7 remain in this position. During a following dispensing operation, shaft 1 starts to turn, and turns coupling wheel 40, and, through latch 44, also the coupling discs 41 and 42. Projection 55 of lever 50 drops into the peripheral coupling recess 47 of the greater disc 41 and slides on the peripheral surface of coupling disc 42. When the coupling means arrives in the position shown in FIG. 2, projection 55 drops into the recess 48 in the smaller coupling disc 42, engages projection 49 of latch 44, and raises latch 44 to a position in which projection 45 releases the respective recess in coupling wheel 40. The coupling means is disengaged, and shaft 1 is disconnected from the tensioning gear 10 of spring 11, which at this time is already fully loaded.

However, if the selected minimum amount was not dispensed, projection 55 will not drop into recess 48 and raise the coupling latch 44 to a disengaged position. The coupling means will stop while projection 55 is still located on the periphery of coupling disc 42, for example in the position shown in FIG. 2. Therefore, coupling 7 remains in coupled position in which projection 45 of latch 44 is located in a recess of coupling wheel 40. Coupling 7 continues to turn in coupled position and passes projection 55, since projection 49 of latch 44 is located inwardly of projection 55 and cannot be engaged by the same. When the coupling 7 has finished the first revolution, which was not completed during the preceding dispensing operation, and has completed a further revolution, then projection 55 of lever 50 drops into the recess 48 of disc 42, and effects raising of latch 44 and disconnection of the coupling.

From the preceding description of the apparatus, it is apparent that the spring 11 will be released when the dispensing nozzle is removed from its support. If the dispensing nozzle is improperly handled, for example removed from its support and then immediately returned, without starting any dispensing operation, the meter will be cleared and the energy stored in the spring accumulator 11 will be consumed, while no dispensing operation follows during which the accumulator could be loaded again. Under such circumstances, it is necessary to load the accumulator by manual operation and for this purpose clearing shaft 31 is provided with a fixed coupling 57 having a slot 58 to which a manually operated handle can be coupled. By turning of the handle, not shown, shaft 31 can be turned until the desired condition of the apparatus is achieved.

For example, the clearing of the meter can be achieved by manual turning of shaft 31.

Due to the fact that the meter can be cleared by a manual operation as well as by an automatic operation, certain locking means must be provided in order to prevent that the dispensing operation is started before the clearing of the meter is completed or that the meter is cleared while fluid is being dispensed.

Figure 8:
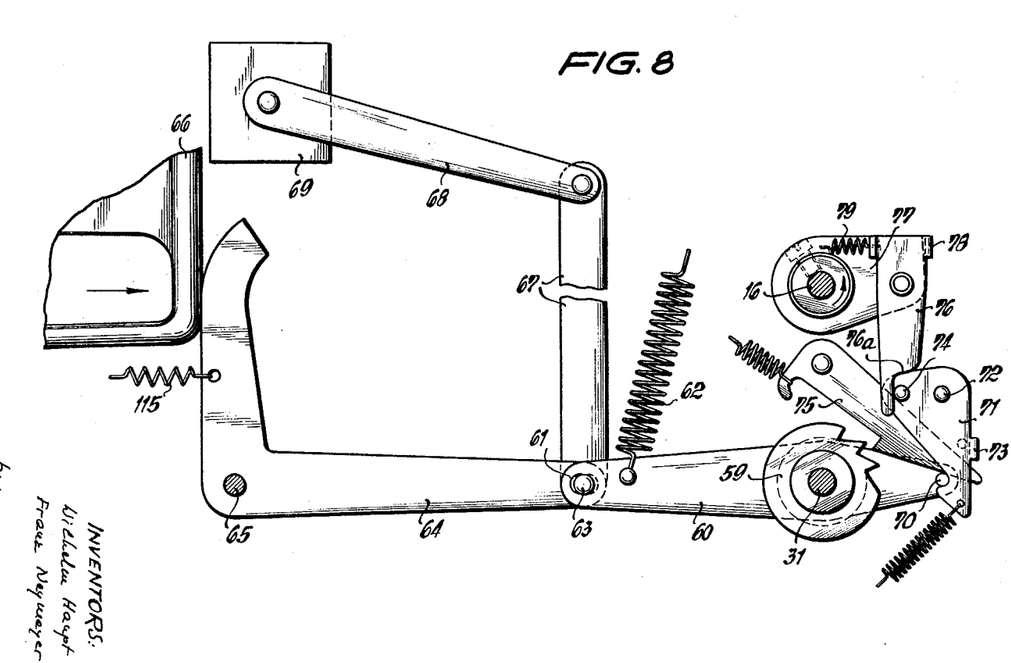
FIG. 8 is a side view, partly in section, taken on section line 8—8 in FIG. 1.

The locking arrangement shown in FIGS. 1, 1c, and 8 is provided for this purpose. As best seen in FIG. 8, the clearing shaft 31 carries an additional ratchet or locking wheel 59, and a locking lever 60 which has an elongated slot 61 at the free end thereof. A spring 62 urges lever 60 to turn in clockwise direction as viewed in FIG. 8. An angular lever 64 is turnable about a pin 65 and has a spring loaded arm 115 abutting on the dispensing nozzle 66. When dispensing nozzle 66 is removed from its support, lever 64 is free to turn in counterclockwise direction. Lever 64 is articulated to a lever 67 pivotally connected to a lever 68 which operates the actuating switch means 69, see also FIG. 1a of motor 109 of pump 110. FIG. 8 shows a position of lever 68 in which the switch is open, and the pump does not operate. When lever 64 turns in counterclockwise direction upon removal of nozzle 66, spring 62 will tend to raise lever 67 to shift lever 68 into a position in which the motor 109 of pump 110 is started. The other end of locking lever 60 carries a pin 70 which cooperates with catch 71 and with a latch 75 which are both spring loaded so as to be urged into the position shown in FIG. 8. Catch 71 is mounted on a pin 72 for turning movement and carries another pin 74 engaging a guide surface on a lever 76 which is turnably mounted on a lever 77 secured to control shaft 16. A spring 79 acts on lever 76 which has a lateral projection 78 engaging lever 77 under the action of spring 79, so that lever 76 can be turned only in clockwise direction.

As is apparent from FIGS. 3 and 3a, control shaft 16 performs first a turning movement through substantially 50° in counterclockwise direction, and then a movement in counterclockwise direction through the same 50° during the clearing of the meter.

When the dispensing nozzle is removed from lever 64, lever 64 does not turn yet in counterclockwise direction since lever 60 is arrested by catch 71. During the clearing operation, shaft 16 first turns in counterclockwise direction through 50°, while lever 76 slides on pin 74 in the position shown in FIG. 8, without any change in the position of catch 71.

However, when control shaft 16 is turned in opposite direction at the end of the clearing operation, guide surface 76a engages pin 74 and turns catch 71 in counterclockwise direction as viewed in FIG. 8 so that pin 70, and thereby lever 60 is released. Spring 62 turns lever 60, and raises link 67 so that switch means 69 is shifted to a position in which the motor 109 of pump 110 starts. Consequently, the dispensing operation can only start if the meter was previously cleared, and the dispensing nozzle removed from its rest.

Turning of lever 60 under the influence of spring 62 removes pin 70 from latch 75 so that the same turns to a position engaging the ratchet wheel 59 so that the clearing shaft 31 is blocked against turning movement while the pump dispenses fluid, and the dispensing nozzle 66 is removed from its rest.

When the dispensing operation is completed, dispensing nozzle 66 is returned to its support, so that lever 64 is turned back to the position illustrated in FIG. 8. Lever 60 also turns, and catch 71 snaps over pin 70 to lock lever 60. At the same time, pin 70 releases latch 75 from locking wheel 59, and lever 67 is lowered to disconnect switch 69.

The preferred embodiment of coupling means has been described with reference to FIGS. 4 to 7, which show two coupling discs 41 and 42. It is contemplated to add a third coupling disc of even greater diameter to the coupling means, whereby the coupling means would be disconnected only after two complete revolutions. A coupling means of this type permits the omission of the transmission 3, 4, 5, 6.

In the event that all number wheels of the meter are in the position 9, or close to this position, the clearing means do not drive the number wheels during almost the entire revolution of the clearing shaft 31. In this event, the clearing shaft 31 may be accelerated to an undesirable extent, and it is advantageous to provide a damping means or centrifugal governor which limits the rotary speed of the clearing shaft.

It will be understood that each of the elements described above, or two or more together, may also find a useful application in other types of apparatus for automatically clearing a meter differing from the types described above.

While the invention has been illustrated and described as embodied in an apparatus including an accumulator loaded by a meter while the same is driven by dispensed fluid, and effecting the clearing of the meter when the dispensing nozzle is removed from its support at the beginning of the following dispensing operation, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for automatically resetting a meter and price computer for dispensed fluid, comprising, in combination, hydraulic motor means driven by dispensed fluid for directly driving the meter and price computer; a resetting shaft for resetting the meter and price computer; an accumulator including a movable element for effecting storage of energy when moved in a loading direction, said element tending to move in the opposite direction to release stored energy; control means for operatively connecting said element to said drive shaft so that said element is moved in said loading direction when the meter and price computer is operated by the dispensed fluid; coupling means for operatively connecting said element to said resetting shaft so that the meter and price computer is reset during movement of said movable element in said opposite direction; blocking means for blocking said element against movement in said opposite direction; and releasing means operatively connected to said blocking means for releasing the same so that said element moves in said opposite direction and effects resetting of the meter and price computer.

2. Apparatus for automatically resetting a meter and price computer for dispensed fluid, comprising, in combination, hydraulic motor means driven by dispensed fluid for directly driving the meter and price computer; a resetting shaft for resetting the meter and price computer; an accumulator including a movable element for effecting storage of energy when moved in a loading direction, said element tending to move in the opposite direction to release stored energy; control means for operatively connecting said element to said drive shaft so that said element is moved in said loading direction; coupling means for operatively connecting said element to said resetting shaft so that the meter and price computer is reset during movement of said movable element in said opposite direction; blocking means for blocking said element against movement in said opposite direction; and releasing means operatively connected to said blocking means for releasing the same so that said element moves in said opposite direction and effects resetting of the meter and price computer, said releasing means having an inoperative position and a releasing position, and including a dispensing member for the dispensed fluid and having a position of rest in which said releasing means is in said inoperative position, and a dispensing position in which said releasing means is in said releasing position so that the meter and price computer is reset when said dispensing member is moved to said dispensing position.

3. Apparatus for automatically resetting a meter and price computer for dispensed fluid, comprising, in combination, hydraulic motor means driven by dispensed fluid for directly driving the meter and price computer; a resetting shaft for resetting the meter and price computer; an accumulator including a movable element for effecting storage of energy when moved in a loading direction, said element tending to move in the opposite direction to release stored energy; an actuating means for starting and stopping a dispensing pump; first control means for operatively connecting said element to said drive shaft so that said element is moved in said loading direction when the meter and price computer is operated by the dispensed fluid; locking means operatively connected to said actuating means and having a locking position for preventing start of the pump; second control means for operatively connecting said element to said resetting shaft so that the meter and price computer is reset during movement of said movable element in said opposite direction; means operatively connecting said locking means with said second control means for holding said locking means in said locking position while said second control means reset the meter and price computer; blocking means for blocking said element against movement in said opposite direction; and releasing means operatively connected to said blocking means for releasing the same so that said element moves in said opposite direction and effects resetting of the meter and price computer.

4. Apparatus for automatically resetting a meter and price computer for dispensed fluid, comprising, in combination, hydraulic motor means driven by dispensed fluid for directly driving the meter and price computer; a resetting shaft for resetting the meter and price computer; an accumulator including a movable element for effecting storage of energy when moved in a loading direction, said element tending to move in the opposite direction to release stored energy; an actuating means for starting and stopping a dispensing pump; first control means for operatively connecting said element to said drive shaft so that said element is moved in said loading direction when the meter and price computer is operated by the dispensed fluid; locking means operatively connected to said actuating means and having a locking position for preventing start of the pump; second control means for operatively connecting said element to said resetting shaft so that the meter and price computer is reset during movement of said movable element in said opposite direction; means operatively connecting said locking means with said second control means for holding said locking means in said locking position while said second control means reset the meter and price computer; blocking means for blocking said element against movement in said opposite direction; and releasing means operatively connected to said blocking means for releasing the same so that said element moves in said opposite direction and effects resetting of the meter and price computer, said releasing means having an inoperative position and a releasing position, and including a dispensing member for the dispensed fluid and having a position of rest in which said releasing means is in said inoperative position, and a dispensing position in which said releasing means is in said releasing position so that the meter and price computer is reset when said dispensing member is moved to said dispensing position, said dispensing member in said position of rest engaging said locking means for holding the same in said locking position.

5. Apparatus for automaatically resetting a meter and price computer for dispensed fluid, comprising, in combination, hydraulic motor means driven by dispensed fluid for directly driving the meter and price computer; a resetting shaft for resetting the meter and price computer; an accumulator including a movable element for effecting storage of energy when moved in a loading direction, said element tending to move in the opposite direction to release stored energy; an actuating means for starting and stopping a dispensing pump; first control means for operatively connecting said element to said drive shaft so that said element is moved in said loading direction when the meter and price computer is operated by the dispensed fluid; locking means operatively connected to said actuating means and having a locking position for preventing start of the pump and another position in which said actuating means start the pump; second control means for operatively connecting said element to said resetting shaft so that the meter and price computer is reset during movement of said movable element in said opposite direction, said second control means being locked in said other position of said locking means; means operatively connecting said locking means with said second control means for holding said locking means in said locking position while said second control means reset the meter and for moving said locking means to said other position when said second coontrol means arrive in a position in which the meter and price computer is reset; blocking means for blocking said element against movement in said opposite direction; and releasing means operatively connected to said blocking means for releasing the same so that said element moves in said opposite direction and effects resetting of the meter and price computer.

6. Apparatus for automatically resetting a meter and price computer for dispensed fluid, comprising, in combination, hydraulic motor means driven by dispensed fluid for directly driving the meter and price computer; a resetting shaft for resetting the meter and price computer; an accumulator including a movable element for effecting storage of energy when moved in a loading direction, said element tending to move in the opposite direction to release stored energy; an actuating means for starting and stopping a dispensing pump; first control means for operatively connecting said element to said drive shaft so that said element is moved in said loading direction when the meter and price computer is operated by the dispensed fluid; locking means operatively connected to said actuating means and having a locking position for preventing start of the pump and another position in which said actuating means start the pump; second control means for operatively connecting said element to said resetting shaft so that the meter and price computer is reset during movement of said movable element in said opposite direction, said second control means being locked in said other position of said locking means; means operatively connecting said locking means with said second control means for holding said locking means in said locking position while said second control means reset the meter and price computer and for moving said locking means to said other position when said second control means arrive in a position in which the meter is reset; blocking means for blocking said element against movement in said opposite direction; and releasing means operatively connected to said blocking means for releasing the same so that said element moves in said opposite direction and effects resetting of the meter and price computer, said releasing means having an inoperative position and a releasing position, and including a dispensing member for the dispensed fluid and having a position of rest in which said releasing means is in said inoperative position, and a dispensing position in which said releasing means is in said releasing position so that the meter and price computer is reset when said dispensing member is moved to said dispensing position, said dispensing member in said position of rest engaging said locking means for holding the same in said locking position, and releasing said locking means for movement to said other position when in said dispensing position.

7. Apparatus for automatically resetting a meter and price computer for dispensed fluid, comprising, in combination, hydraulic motor means driven by dispensed fluid for directly driving the meter and price computer; a resetting shaft for resetting the meter and price computer; an accumulator including a movable element for effecting storage of energy when moved in a loading direction, said element tending to move in the opposite direction to release stored energy; control means for operatively connecting said element to said drive shaft so that said element is moved in said loading direction when the meter and price computer is operated by the dispensed fluid, said control means including transmission means connecting said drive shaft with said movable element and having a selected ratio of transmission to effect full loading of said accumulator by a selected minimum amount of dispensed fluid; coupling means for operatively connecting said element to said resetting shaft so that the meter and price computer is reset during movement of said movable element in said opposite direction; blocking means for blocking said element against movement in said opposite direction; and releasing means operatively connected to said blocking means for releasing the same so that said element moves in said opposite direction and effects resetting of the meter and price computer.

8. Apparatus for automatically resetting a meter and price computer for dispensed fluid, comprising, in combination, hydraulic motor means driven by dispensed fluid for directly driving the meter and price computer; a resetting shaft for resetting the meter and price computer; an accumulator including a movable element for effecting storage of energy when moved in a loading direction, said element tending to move in the opposite direction to release stored energy; control means for operatively connecting said element to said drive shaft so that said element is moved in said loading direction when the meter and price computer is operated by the dispensed fluid, said first control means including transmission means connecting said drive shaft with said movable element and having a selected ratio of transmission to effect full loading of said accumulator by a selected minimum amount of dispensed fluid, said transmission means including a one-way coupling means turning in coupled position one revolution for fully loading said accumulator during dispensing of the selected minimum amount of fluid, and being disconnected after completion of one revolution to prevent overloading of said accumulator; second control means for operatively connecting said element to said resetting shaft so that the meter and price computer is reset during movement of said movable element in said opposite direction; blocking means for blocking said element against movement in said opposite direction; and releasing means operatively connected to said blocking means for releasing the same so that said element moves in said opposite direction and effects resetting of the meter and price computer.

9. An apparatus as set forth in claim 1 comprising, manually operated means connected to said resetting shaft for clearing the meter.

10. Apparatus for automatically resetting a meter and price computer for dispensed fluid, comprising, in combination, a drive shaft driven by dispensed fluid for driving the meter and price computer; a resetting shaft for resetting the meter and price computer; a circular disk fixed to said resetting shaft and having a slot; an accumulator including a movable spring element for effecting storage of energy when moved in a loading direction, said spring element tending to move in the opposite direction to release stored energy, and first and second members connected to the ends of said spring element, said second member including a ratchet wheel; a spring-loaded latch cooperating with said ratchet wheel and turnably supported by said resetting shaft; first control means for operatively connecting said first member to said drive shaft so that said element is moved in said loading direction when the meter and price computer is operated by the dispensed fluid, and including means for blocking rotation of said first member in said opposite direction; second control means for operatively connecting said second member to said resetting shaft so that the meter and price computer is reset during movement of said movable spring element in said opposite direction, said second control means including a control shaft, another disc fixed to said control shaft and having a pin cooperating with said slot, an abutment lever fixed to said control shaft and cooperating with said latch, and spring means connected to said other disc for turning the same into a normal position in which said pin is located in said slot so that upon release of said blocking means said ratchet wheel and said latch turn through an angle greater than 360° until said pin engages said slot again, whereupon said spring means turns said other disc and through said pin and circular disc back through the angle part exceeding 360°; blocking means for blocking said second member and thereby said spring element against movement in said opposite direction; and releasing means operatively connected to said blocking means for releasing the same so that said second member moves in said opposite direction and effects resetting of the meter and price computer.

11. Apparatus as set forth in claim 10, wherein said second member is a gear; and wherein said blocking means include another gear meshing with said gear, a blocking disc connected to said other gear for rotation, a spring-loaded blocking member mounted on said disk; a blocking lever engaging said blocking member; and wherein said releasing means are connected to said blocking lever for disengaging the same from said blocking member.

12. Apparatus for automatically resetting a meter and price computer for dispensed fluid, comprising, in combination, a drive shaft driven by dispensed fluid for driving the meter and price computer; a resetting shaft for resetting the meter and price computer; an accumulator including a movable spring element for effecting storage of energy when moved in a loading direction, said spring element tending to move in the opposite direction to release stored energy, and first and second members connected to the ends of said spring element; an actuating means for starting and stopping a dispensing pump; first control means for operatively connecting said first member to said drive shaft so that said element is moved in said loading direction when the meter and price computer is operated by the dispensed fluid, and including means for blocking movement of said first member in said opposite direction; locking means operatively connected to said actuating means and having a locking position for preventing start of the pump and another position in which said actuating means start the pump; second control means for operatively connecting said second member to said resetting shaft so that the meter and price computer is reset during movement of said movable spring element in said opposite direction, said second control means being locked in said other position of said locking means; means operatively connecting said locking means with said second control means for holding said locking means in said locking position while said second control means reset the meter and price computer, and for moving said locking means to said other position when said second control means arrive in a position in which the meter and price computer is reset; blocking means for blocking said second member and thereby said spring element against movement in said opposite direction; and releasing means operatively connected to said blocking means for releasing the same so that said second member moves in said opposite direction and effects resetting of the meter and price computer, said releasing means having an inoperative position and a releasing position and including a dispensing member for the dispensed fluid and having a position of rest in which said releasing means is in said inoperative position, and a dispensing position in which said releasing means is in said releasing position so that the meter and price computer is reset when said dispensing member is moved to said dispensing position, said dispensing member in said position of rest engaging said locking means for holding the same in said locking position, and releasing said locking means for movement to said other position when in said dispensing position.

13. Apparatus as set forth in claim 12, wherein said actuating means is a switch for starting and stopping an electric pump motor; and wherein said locking means include a plurality of spring-loaded articulated levers connected to said switch for actuating the same and also controlled by said dispensing member, and catch means operatively connected to said second control means and normally locking said articulated levers and releasing the same when said second control means are at a position in which the meter and price computer is reset so that said spring-loaded levers move said switch to start the motor when said dispensing member releases said levers.

14. Apparatus as set forth in claim 13, wherein said locking means include a locking wheel connected to said second control means for movement, and a latch cooperating with said locking wheel and operatively connected to said levers for locking said locking wheel when said levers move said switch to a position for starting the electric pump motor.

15. Apparatus for automatically resetting a meter and price computer for dispensed fluid, comprising, in combination, a drive shaft driven by dispensed fluid for driving the meter and price computer; a resetting shaft for resetting the meter and price computer; an accumulator including a movable element for effecting storage of energy when moved in a loading direction, said element tending to move in the opposite direction to release stored energy; first control means for operatively connecting said element to said drive shaft so that said element is moved in said loading direction when the meter and price computer is operated by the dispensed fluid, said first control means including transmission means having a coupling means turning in coupled condition only one revolution for fully loading said accumulator, said coupling means including a coupling wheel having peripheral recesses, first and second coupling discs connected to each other and located on opposite sides of said coupling wheel, said coupling discs having first and second peripheral coupling recesses, respectively, said first coupling disc having a greater diameter than said second coupling disc, said second coupling disc having a spring-loaded coupling latch mounted thereon and having a first projection cooperating with said recesses of said coupling wheel and a second projection located in said second peripheral coupling recess, a control lever sliding along the periphery of said second coupling disc for raising said latch, shifting means for shifting said control lever into a position sliding on the periphery of said first coupling wheel so that said latch is raised during a second revolution of said coupling means if the first revolution was not completed; second control means for operatively connecting said element to said resetting shaft so that the meter and price computer is reset during movement of said movable element in said opposite direction; blocking means for blocking said element against movement in said opposite direction, said shifting means being operatively connected to said blocking means and operated by the same upon release.

(References on following page)

References Cited in the file of this patent

UNITED STATES PATENTS

| | | |
|---|---|---|
| 2,084,288 | Lolley et al. | June 15, 1937 |
| 2,105,813 | Goss | Jan. 18, 1938 |
| 2,126,103 | Fraser | Aug. 9, 1938 |
| 2,157,745 | Wydler | May 9, 1939 |
| 2,173,477 | Goss | Sept. 19, 1939 |
| 2,587,925 | Thomas | Mar. 4, 1952 |
| 2,595,259 | Hill et al. | May 6, 1952 |
| 2,599,556 | Jacobs | June 10, 1952 |